A. GRAVEL.
SEATING ARRANGEMENT FOR COUPES.
APPLICATION FILED FEB. 13, 1918.
1,390,356.
Patented Sept. 13, 1921.
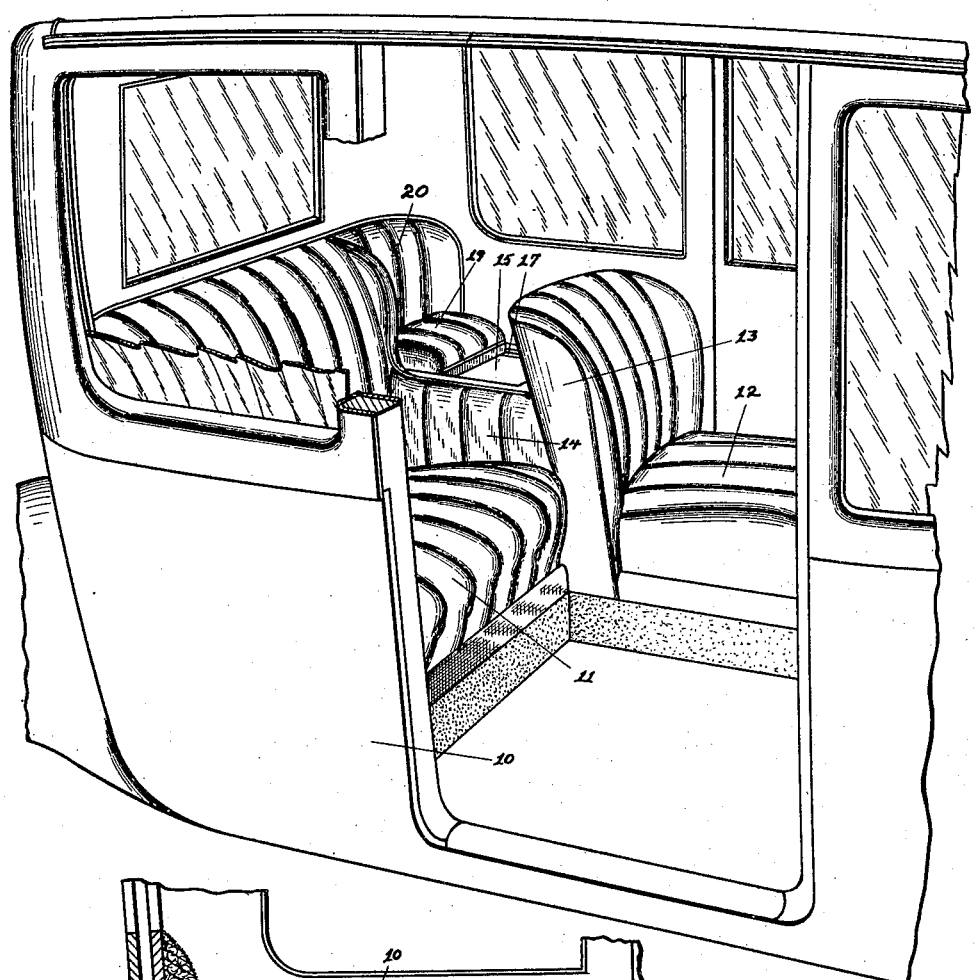
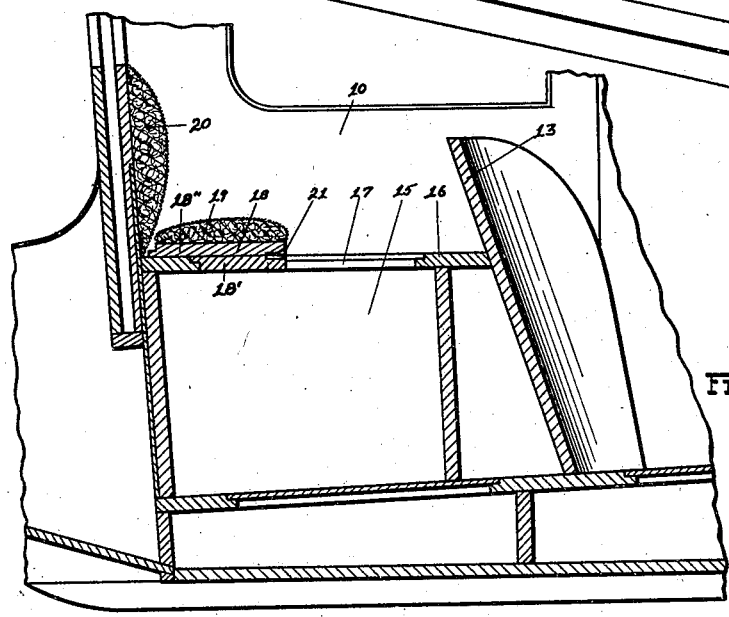
Fig. I.
Fig. II.
Inventor
Abundius Gravel
By Chester H. Braselton
Attorney

UNITED STATES PATENT OFFICE.

ABUNDIUS GRAVEL, OF TOLEDO, OHIO, ASSIGNOR TO THE WILLYS-OVERLAND COMPANY, OF TOLEDO, OHIO, A CORPORATION OF OHIO.

SEATING ARRANGEMENT FOR COUPÉS.

1,390,356.  Specification of Letters Patent.  Patented Sept. 13, 1921.

Application filed February 13, 1918. Serial No. 216,854.

*To all whom it may concern:*

Be it known that I, ABUNDIUS GRAVEL, a citizen of the United States, residing at Toledo, in the county of Lucas and State of Ohio, have invented certain new and useful Improvements in Seating Arrangements for Coupés, of which I declare the following to be a full, clear, and exact description.

This invention relates to improvements in seating arrangements for coupés and similar motor vehicles.

The principal object of this invention is to provide an improved child's seat for coupés which seat is of such a nature that when not in use it is out of the way and does not interfere with the seating arrangements for the remainder of the coupé.

A further object of my invention is to provide a combined storage compartment and child's seat of such a nature that the use of the seat does not interfere with the normal use of the storage compartment, while, when the seat is not in use, it may be folded down to close the storage compartment without interfering with the remaining seating accommodations of the coupé.

Further objects, and objects relating to economies of manufacture and details of construction, will definitely appear from the detailed description to follow.

I accomplish my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a fragmentary, perspective view of a coupé embodying my invention, and Fig. II is a detail, sectional view through the storage compartment formed in the coupé behind the driver's seat.

In the drawings, similar reference numerals refer to similar parts throughout the several views.

Considering the numbered parts of the drawing, I have shown a coupé comprising the body 10, the passenger's seat 11, and the driver's seat 12, which is advanced slightly somewhat in front of the passenger's seat, and provided with a back 13. A side panel 14 is provided at the left of the passenger's seat, said side panel also forming one wall of the storage compartment 15 which is formed in the rear of the back 13 behind the driver's seat and at the left of the side panel 14 of the passenger's seat. This compartment 15 is closed at the top by the frame comprising the top member 16 having an opening 17 therein, which opening is closed by the cover 18, the cover being of two parts, 18' and 18" connected together by means of the hinges 21. The upper side of the cover members 18' and 18" as shown are not upholstered, although if desired this side of the cover members may be upholstered, and the lower side of the cover member 18" is provided with tufting 19 so as to form a seat cushion attached to the lower side of the cover member 18." A back 20 is built into the rear wall of the body 10 adjacent to the rear of the compartment 15 as clearly shown in the drawing.

In the drawing, I have shown the cover open with its upper surface resting on the upper surface of the top member 16 so that the seat cushion 19 is uppermost. In this position this may be used as a child's seat, the back 20 forming the back of the seat, being so located as to form a comfortable back rest and support for the child, who may sit on the cushion 19 with its feet extending through the opening 17 into the upper part of the storage compartment. When it is not desired to use the child's seat, the cover may be swung on its hinges so that the cushion 19 is within the compartment 15 and this presents the usual appearance of a storage compartment in a coupé.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a motor vehicle provided with a passenger's seat and a driver's seat advanced in front of said passenger's seat, the combination of a storage compartment formed in the rear of said driver's seat and to one side of the passenger's seat; a top wall closing the upper end of said storage compartment, and provided with an opening therein; a hinged cover closing said opening; a back formed in line with the rear end of said top wall; a cushion secured to the lower face of said cover and adapted to be disposed with its rear end in line with the lower edge of said back when said cover is fully open.

2. The combination with a motor vehicle provided with a passenger's seat and a driver's seat having a back extending substantially in line with the front edge of the passenger's seat, of partition walls forming a storage compartment in the rear of said driver's seat and to one side of the passenger's seat; a top wall closing said compartment and provided with an opening therein: a hinged cover for said opening; and a cushion secured to the lower side of said cover.

3. In a motor vehicle provided with a seat extending partially across the available interior space of the vehicle, partition walls forming a storage compartment at one side of the seat, a fixed top for the rear portion of said compartment, and a removable top for the forward portion thereof, whereby leg room may be provided within the storage compartment for a passenger sitting upon the fixed top of the compartment.

4. In a motor vehicle, a seat extending partially across the available interior space of the vehicle, partition walls forming a storage compartment at one side of the seat, a fixed cover extending across the rear portion of said compartment, a cover for the forward portion hinged at its rear edge, said hinged cover when folded back upon the fixed cover being adapted to serve as a seat and the storage compartment furnishing leg room for the occupant of the seat.

5. In a motor vehicle, a passenger's seat extending partially across the available interior space of the vehicle and having a seat back extending entirely across the available interior space of the vehicle, a driver's seat having a back extending substantially in line with the front edge of the passenger's seat, and a storage compartment at the rear of the driver's seat provided across its forward portion with a cover hinged along its rear edge and adapted to coöperate with the seat back portion at the side of the passenger's seat to provide an auxiliary seat.

In testimony whereof, I affix my signature.

ABUNDIUS GRAVEL.